United States Patent
Woods (10) Patent No.: US 8,136,235 B2
(45) Date of Patent: *Mar. 20, 2012

(54) SELF-DIAGNOSING PIERCE NUT INSTALLATION APPARATUS

(75) Inventor: Harold T. Woods, Flat Rock, MI (US)

(73) Assignee: Whitesell International Corporation, Taylor, MI (US)

( * ) Notice: Subject to any disclaimer, the term of this patent is extended or adjusted under 35 U.S.C. 154(b) by 1361 days.

This patent is subject to a terminal disclaimer.

(21) Appl. No.: 10/594,203

(22) PCT Filed: Dec. 3, 2003

(86) PCT No.: PCT/US03/38301
§ 371 (c)(1),
(2), (4) Date: Apr. 27, 2007

(87) PCT Pub. No.: WO2004/094100
PCT Pub. Date: Nov. 4, 2004

(65) Prior Publication Data
US 2007/0274804 A1    Nov. 29, 2007

(51) Int. Cl.
*B23P 19/00* (2006.01)

(52) U.S. Cl. .......... 29/798; 29/818; 29/243.5; 29/432.2; 227/2; 227/5; 227/6

(58) Field of Classification Search .......... 29/798, 29/818, 788, 243.5, 432.2, 505, 509; 227/2, 227/3, 5, 6, 7, 8
See application file for complete search history.

(56) References Cited

U.S. PATENT DOCUMENTS

| 3,108,368 | A |  | 10/1963 | Steward |
| 3,405,436 | A |  | 10/1968 | Koett |
| 3,487,976 | A |  | 1/1970 | Matthews |
| 3,766,628 | A |  | 10/1973 | Grube |
| 3,845,860 | A |  | 11/1974 | Ladouceur et al. |
| 3,878,599 | A |  | 4/1975 | Ladouceur et al. |
| 3,921,276 | A |  | 11/1975 | Oaks |
| 3,927,452 | A |  | 12/1975 | Pouch et al. |
| 3,969,809 | A |  | 7/1976 | Pouch et al. |
| 4,153,989 | A |  | 5/1979 | Shinjo |
| 4,348,796 | A |  | 9/1982 | Smallegan |
| 4,484,385 | A |  | 11/1984 | Woods |
| 4,610,072 | A |  | 9/1986 | Muller |
| 4,630,363 | A |  | 12/1986 | Woods |
| 4,649,753 | A | * | 3/1987 | Goodsmith .................. 73/865.8 |
| 4,700,470 | A |  | 10/1987 | Muller |
| 4,785,529 | A |  | 11/1988 | Pamer et al. |
| 5,208,963 | A |  | 5/1993 | Ladouceur |
| 5,239,740 | A |  | 8/1993 | Ladouceur |
| 5,444,908 | A |  | 8/1995 | Kazino |
| 5,455,848 | A | * | 10/1995 | Baker et al. ..................... 377/2 |
| 5,502,888 | A | * | 4/1996 | Takahashi et al. ............. 29/798 |
| 5,533,250 | A | * | 7/1996 | Ladouceur ..................... 29/702 |

(Continued)

*Primary Examiner* — Essama Omgba
(74) *Attorney, Agent, or Firm* — Dierker & Associates, P.C.

(57) ABSTRACT

A self-diagnosing pierce nut installation apparatus including an installation head attached to an upper die member of a die press having a reciprocating plunger driving a pierce nut against a panel, piercing a slug from the panel upon closing of the press and a rod telescopically received in the plunger resiliently biased through the nut bore if a slug is pierced from the panel or against the panel if not pierced, and a sensor sensing axial movement of the rod, stopping the press if the rod engages the panel. A die located in the lower die member includes a slug sensor confirming receipt of the panel slug through the die member.

15 Claims, 3 Drawing Sheets

U.S. PATENT DOCUMENTS

| | | |
|---|---|---|
| 5,953,813 A | 9/1999 | Sickels et al. |
| 6,058,598 A | 5/2000 | Dixon et al. |
| 6,401,507 B1 * | 6/2002 | Krcek et al. .................... 72/55 |
| 6,912,776 B2 * | 7/2005 | Vrana ............................ 29/798 |
| 6,957,483 B2 | 10/2005 | Woods |
| 7,032,296 B2 * | 4/2006 | Zdravkovic et al. ........... 29/709 |
| 7,269,893 B2 * | 9/2007 | Ericsson ........................ 29/798 |
| 2005/0210651 A1 * | 9/2005 | Vrana et al. ................. 29/432.1 |
| 2007/0234547 A1 * | 10/2007 | Lanni et al. .................... 29/432 |

* cited by examiner

SELF-DIAGNOSING PIERCE NUT INSTALLATION APPARATUS

FIELD OF THE INVENTION

This invention relates to a pierce nut installation apparatus which continuously monitors the pierce nut installation and automatically shuts down the die press in the event that the last pierce nut is not properly installed.

BACKGROUND OF THE INVENTION

As will be understood by those skilled in this art, pierce nuts are typically installed in a metal plate or panel by an installation apparatus including an installation head generally attached to the upper die platen or shoe of a reciprocating die press and a die member or die button installed in the lower die shoe or die platen, wherein the panel is fixed to the lower die shoe or die platen overlying the die button. Pierce nuts are fed to the installation head opposite a reciprocating plunger which, upon closing of the die press, drives the pierce nut into the panel, piercing a slug from the panel, and the die button then installs the pierce nut in the pierced panel opening. The slug pierced from the panel is then received in an opening in the die button, which typically retains several slugs before ejecting the slugs. The panel may be simultaneously formed by the die press and several pierce nuts may be simultaneously installed in the panel with each stroke of the die press, particularly in mass production applications. On occasion, through misalignment, improper die press setting or improper nut installation, the panel slug may remain attached or partially attached to the panel causing potential quality issues during the assembly operation, wherein the panel having the pierce nut attached is assembled to a second component. In the automotive industry, for example, the assembly operation is typically carried out at a different location. Another problem associated with the installation of pierce nuts is the stacking of the panel slugs in the die button opening. The stack of slugs may "cold weld" together, forming a barrier to the entrance of further slugs and resulting in a poor or partial installation of the pierce nuts or requiring greater force to push out the slugs. It is not always possible to visually inspect the opening through the die button, particularly in time to shut down the die press to avoid improper installation of further pierce nuts by the installation apparatus. Further, the improper installation of the pierce nuts described above may not be discovered until later in the assembly process.

It would therefore be very desirable to continuously monitor the pierce nut installations during the installation of the pierce nuts and simultaneously monitor the slugs pierced from the panel during installation. However, the prior art does not disclose an apparatus or method capable of continuously monitoring these problems and potential problems with the installation of pierce nuts.

SUMMARY OF THE INVENTION

The pierce nut installation apparatus of this invention is self-monitoring. That is, the pierce nut installation apparatus of this invention continuously monitors the installation of each pierce nut by the pierce nut installation head and the slugs pierced from the panel to assure continued proper installation of pierce nuts or shut down the die press for maintenance or repair prior to installation of the next pierce nut. The sensors in the pierce nut installation apparatus of this invention are connected to the computer logic of the die press. In the event that the sensor system determines that a pierce nut has not been properly installed in the panel or that a slug has not been pierced from the panel and received through the die button, the press is stopped at the top of the stroke for maintenance of the pierce nut installation apparatus or die press, permitting immediate correction of the problem and avoiding incorrectly installed pierce nuts and potential scrap of further panel assemblies.

The pierce nut installation head of this invention includes a plunger passage and a pierce nut feed passage intersecting the plunger passage. A feed mechanism feeds pierce nuts through the feed passage into the plunger passage opposite a reciprocating plunger in the plunger passage. Upon closing of the die press, the plunger reciprocates through the plunger passage to install a pierce nut in a panel supported on a die button as described above. A conventional pierce nut includes a projecting pilot portion, flange portions on at least opposed sides of the pilot portion and a bore extending through the pilot portion. The pilot portion pierces a slug from the panel in cooperation with the die button and the die button then deforms the panel metal adjacent the pierced panel opening into a groove or grooves in the pierce nut, permanently attaching the pierce nut to the panel. The pierced panel slug is then received in a central opening in the die button.

In a preferred embodiment of the pierce nut installation head of this invention, a slug probe rod is telescopically received through the plunger having a proximal end initially generally parallel to or spaced above the free proximal end of the plunger, opposite the pierce nut in the plunger passage when the die press is in the open position, and a distal end which is resiliently biased toward the proximal end of the plunger. The slug probe rod preferably has an axial length greater than the axial length of the plunger such that, upon closing of the die press, the slug probe rod extends through the plunger into the pierce nut bore a distance greater than the thickness of the pilot portion of the pierce nut if a slug has been pierced from the panel. If a slug has not been pierced from the panel, the proximal end of the slug probe rod will engage the panel indicating that a pierce nut has not been properly installed in the panel or a slug has not been fully pierced from the panel. As will be understood by those skilled in this art, the distal end of the plunger of a conventional pierce nut installation head may be fixed to or spaced from the back-up plate attached to the upper die platen. Upon closing of the die press, the distal end of the plunger engages the back-up plate or is fixed to the back-up plate and the proximal end of the plunger drives the pierce nut through the plunger passage. Because the slug probe rod is resiliently biased toward the proximal end of the plunger, the proximal end of the slug probe rod is then received into the bore of the pierce nut to either engage the panel, if a slug has not been fully pierced from the panel, or through the nut bore if a slug has been pierced from the panel. The slug probe rod also serves the function of removing a slug from the panel in the event that a slug is partially pierced from the panel and hanging, for example, from the panel. A sensor of the pierce nut installation head then determines whether the slug probe rod has been received through the pierce nut bore and signals the computer logic of the die press to recycle the die press and install a second pierce nut in a second panel. However, if the sensor determines that the slug rod probe has not been received through the pierce nut bore, the sensor signals the computer logic of the die press to stop the press, preferably at the top of the stroke of the die press, when the press is open, for inspection, repair and maintenance as required.

In one preferred embodiment, the slug probe rod is mechanically biased toward the proximal end of the plunger by a conventional coil spring. In this embodiment, the distal end of the slug probe rod includes an enlarged head portion and the spring is biased against the enlarged head portion of the slug probe rod. In an alternative embodiment, the slug probe rod is resiliently biased toward the proximal end of the plunger by pneumatic pressure. In this alternative embodiment, the back-up plate includes a bore which receives an enlarged distal end of the slug probe rod which has an O-ring or other sealing means and pneumatic pressure resiliently biases the slug probe rod toward the proximal end of the plunger. As used herein, the term "proximal" refers to a component or a portion of a component closest to the pierce nut in the plunger passage and the term "distal" refers to a component or a portion of a component furthest from the pierce nut in the plunger passage. As will be understood, these terms used are for descriptive purposes only. In the disclosed embodiments, the pierce nut installation head of this invention includes a probe or sensor which senses the location and movement of the distal end of the slug probe rod.

In a preferred embodiment of the installation apparatus utilizing the slug probe rod as described above, the die button fully ejects the panel slug from the bore in the die button following installation of a pierce nut in a panel contrary to the teaching of the prior art. As set forth above, a conventional die button typically retains several panel slugs before injecting the slugs from the die button to prevent a panel slug from adhering to the panel following installation. In a typical die button, the opening through the die button is generally rectangular to receive rectangular panel slugs, but the die button bore includes rounded corners which receive and retain a plurality of panel slugs and prevent the panel slugs from being drawn upwardly against the panel upon opening of the die press and removal of the panel from the die press. A vacuum may be created following installation and the panel slugs then fall from the panel during handling, littering the workplace. However, the resiliently biased slug probe rod of the installation head of this invention positively ejects the slug through the die button bore, preventing the slug from being drawn against the panel. In a preferred embodiment of the die button utilized with the pierce nut installation head of this invention, the opening through the die button is generally frustoconical, having an opening configured to receive the panel slug and tapered radially outwardly to assure complete ejection of the panel slug through the die button bore. The problem associated with panel slugs adhering to the pierce nut and panel assembly following installation has been eliminated by the resiliently biased slug probe rod.

As set forth above, the self-monitoring pierce nut installation apparatus of this invention may also be used to determine whether a panel slug is received through the die button, indicating that the panel has not only been pierced, but also that the pierced panel slug has been fully removed from the panel and discharged through the die button. As set forth above, the current design of the pierce nut die button, the die button retains several slugs which, on occasion, can cold weld together, blocking the opening through the die button and resulting in improper installation of the pierce nuts or requiring greater force to remove the slugs. Another problem is that the slug may only be partially pierced from the panel and hangs from the panel as described above. The pierce nut installation apparatus of this invention preferably includes a slug sensor which determines whether the pierced panel slug is received through the central opening or bore in the die button and discharged.

The slug sensor is also connected to the computer logic of the die press. If a slug is received through the opening through the die button and discharged, the sensor signals the computer logic of the die press to recycle the press and install a pierce nut in a second panel as described above. If, however, the slug sensor indicates that a slug has not been received through the central opening of the die button and discharged, the sensor signals the computer logic of the die press to stop the press in the open position for corrective maintenance. In one embodiment of the pierce nut installation head of this invention, the pierce nut installation head includes a sensor ring having an opening coaxially aligned with the opening through the die button and a conductive coil surrounds the opening of the ring sensor which creates a magnetic field which signals that a slug has been received through the opening through the die button and discharged. As will be understood, the conductive coil can also be located at the exit of the central opening of the die button. In an alternative embodiment, the sensor includes an infrared beam or similar sensing device which senses the ejection of the pierced panel slug from the die button.

As will be understood, the slug probe rod sensor and the slug sensor associated with the die button of the pierce nut installation apparatus of this invention may be utilized individually or in combination, but one preferred embodiment of the pierce nut installation head of this invention includes both features.

DESCRIPTION OF THE PREFERRED EMBODIMENTS

Figures 1, 4:
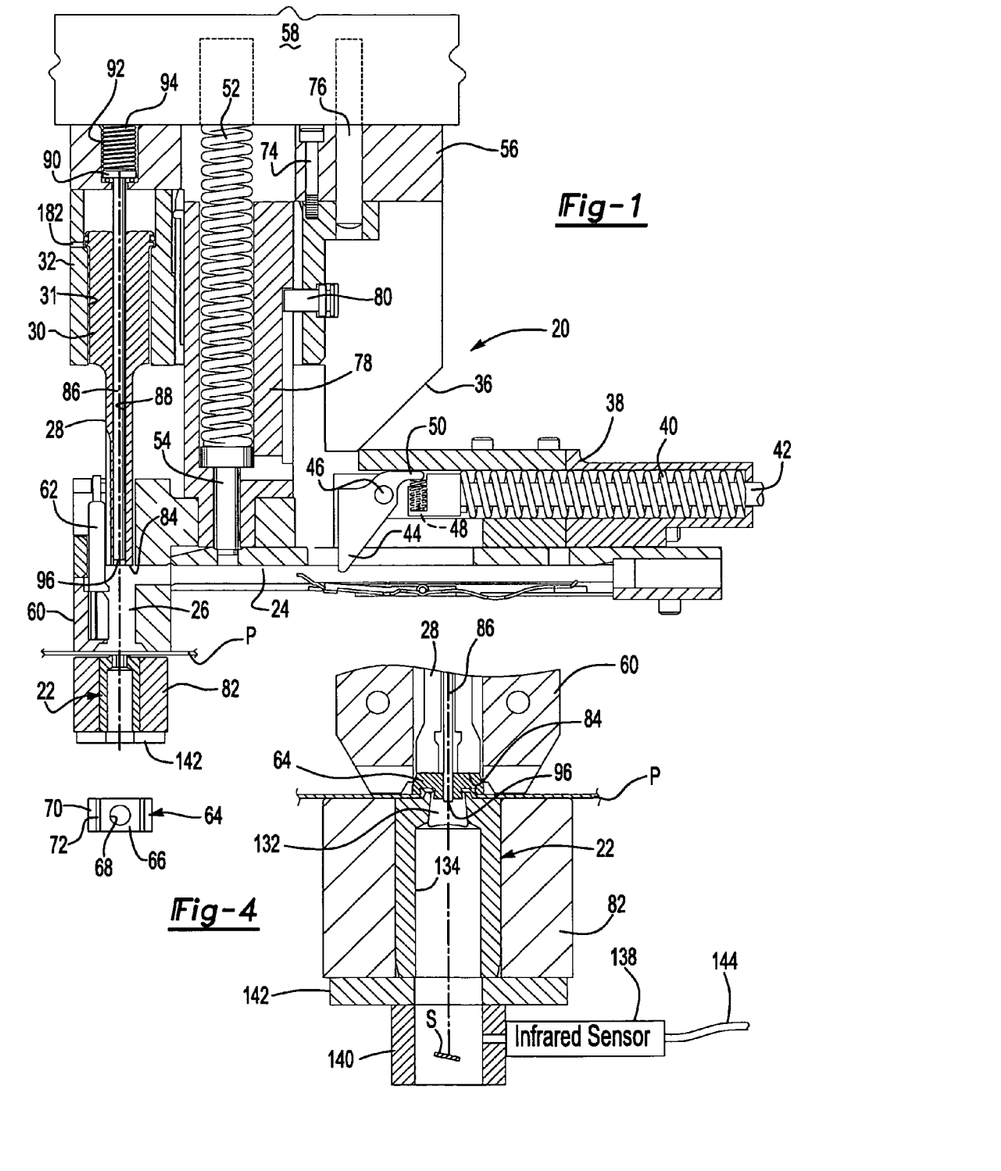
FIG. 1 is a side cross-sectional view of one embodiment of a pierce nut installation head of this invention.
FIG. 4 is a partial side cross-sectional view of FIGS. 1 and 2 illustrating one embodiment of a slug sensor.

FIG. 1 illustrates one embodiment of the pierce nut installation apparatus of this invention which includes a pierce nut installation head 20 and a die button 22. As set forth above, a conventional pierce nut installation apparatus includes a pierce nut installation head typically attached to the upper die shoe or die platen of a die press (not shown) and a die member or die button is typically attached to the lower die shoe or die platen of the die press. Pierce nuts are received by the installation head and a pierce nut is installed with each stroke of the die press.

The disclosed embodiment of the pierce nut installation head 20 includes a pierce nut feed passage 24 and a transverse plunger passage 26 which intersects and communicates with the feed passage 24 and a plunger 28 reciprocates through the plunger passage 26 to install a pierce nut 64 in a panel P as will be understood by those skilled in this art and further described below. A pierce nut 64 described below is shown opposite the plunger passage 26 for reference purposes. The plunger 28 includes a distal end 30 which, in this embodiment, reciprocates in an opening 31 in the plunger support cam base 32. The cam base 32 includes an inclined surface 36 which receives a roller or rollers (not shown) on the pierce nut feed adapter assembly 38. The pierce nut feed adapter assembly 38 includes a coil spring 40 having a rod 42 receiving a feed pawl 44, which is pivotally supported at 46 and the feed pawl 44 includes a finger 50 and a return spring 48 rotates the feed pawl 44 in a counterclockwise direction in FIG. 1. The disclosed embodiment of the pierce nut installation head 20 further includes a shank spring 52 which is resiliently biased against a chute attaching pin 54. The pierce installation head 20 is mounted on a back-up plate 56 and the back-up plate 56 is mounted on the upper die shoe or die platen 58 of a die press (not shown). The disclosed embodiment of the pierce nut installation head 20 further includes a nose assembly 60 which may include a proximity probe 62 presently used to indicate the presence or absence of a pierce nut 64 in the plunger passage 26 of the nose member 60. The pierce nut 64 is shown in FIG. 1 for reference purposes only and has been rotated for this purpose. One embodiment of a pierce nut 64 which may be installed by the pierce nut installation apparatus of this invention includes a central projecting pilot portion 66 having a bore 68 therethrough, flange portions 70 on opposed sides of the pilot portion 66 and dovetail-shaped grooves 72 in the flange portion 70.

As thus far described, the pierce nut installation head 20 is conventional generally as disclosed in U.S. Pat. No. 3,108,368 assigned to the assignee of the predecessor in interest of this application, the disclosure of which is incorporated herein by reference. The disclosed feed adapter assembly 38 is specifically adapted for feeding pierce nuts interconnected by frangible wires as disclosed, for example, in U.S. Pat. No. 3,845,860, also assigned to the predecessor in interest of the assignee of this application. However, the pierce nut installation head may also be adapted for feeding pierce nuts from a hopper in bulk form as disclosed, for example, in U.S. Pat. No. 3,487,976, also assigned to the predecessor in interest of the assignee of this application. Briefly, pierce nuts 64 are received in the feed passage 24 and fed seriatim from the feed passage 24 to the plunger passage 26 by the feed pawl 44. The pierce nut installation head may be attached to the back-up plate 56 by any suitable means, including bolts 74 and the back-up plate 56 is attached to the upper die shoe or die platen 58 by bolts (not shown) and aligned by dowel pins 76. The assembly further includes a shank 78 which receives the shank spring 52 and a shank stop pin 80 limits movement of the plunger support cam base 32 and shank 78 relative to the nose assembly 60 as now described. Upon closing of the die press,(not shown) the nose assembly 60 first engages the panel P as shown in FIG. 1. The panel P is supported on the die button 22 and the die button 22 is supported in a support block 82 in the lower die shoe or die platen (not shown) of the die press. As the upper die platen or die shoe 58 is driven toward the lower die platen, the nose assembly 60 remains stationary relative to the panel P and the plunger 28 is then received against the back-up plate 56 and finally the plunger 28 is driven through the plunger passage 26, wherein the proximal end 84 of the plunger 28 engages a pierce nut 64 to install the pierce nut in the panel P. Alternatively, the plunger 28 may be fixed relative to the back-up plate 56. As further described in the above-referenced U.S. patents, the projecting central pilot portion 66 of the pierce nut 64 initially pierces a slug from the panel P and the die button 22 deforms the panel surrounding the pierce panel opening into the grooves 72 as known to those skilled in this art.

However, as set forth above, a pierce nut is not always properly installed in the panel, particularly in mass production applications. The die press may include several pierce nut installation heads and the panel P may be simultaneously formed by the die press. An improper pierce nut installation may result, for example, from improper die press setting, misalignment or improper feeding of the pierce nuts from the feed passage 24 to the plunger passage 26 and other causes. Another problem associated with the present design of the pierce nut installation apparatus disclosed in the above-referenced U.S. patents is that the panel slugs may jam and cold weld in the die button bore eventually resulting in improper pierce nut installations. Further, improper pierce nut installations may not be discovered in time to prevent continued improper pierce nut installations, particularly where the pierce nut and panel assemblies are transferred to another area for example for assembly. Visual inspection by the press operator may not be sufficient to detect improperly installed pierce nuts, particularly where several pierce nuts are installed in each panel by the die press. The pierce nut installation apparatus of this invention continuously monitors the pierce nut installation and removal of the panel slugs from the die button without littering the workplace with panel slugs resulting from adherence of the panel slugs to the pierce nut and panel assembly.

The embodiment of the pierce nut installation head 20 shown in FIG. 1 includes a generally cylindrical slug probe rod 86 telescopically received in an axial bore 88 of the plunger 28 preferably, but not necessarily having an axial length greater than the plunger 28. In this embodiment, the slug probe rod 86 includes an enlarged head portion 90 which is received in a cylindrical bore 92 in the back-up plate 56 and a coil spring 94 resiliently urges the slug probe rod 86 toward the panel P. Prior to installation of a pierce nut in the panel P, the proximal end 96 of the slug probe rod 86 is generally parallel to or spaced above the proximal end 84 of the plunger 28 as shown in FIG. 1. As described below with regard to FIG. 3, a sensor connected to the control of the die press (not shown) monitors the axial position of the slug probe rod 86 to determine whether a slug has been pierced from the panel by the pierce nut 64 and the coil spring 94 ejects the panel slug from the panel through the die button 22, preventing adherence of the panel slug to the pierce nut and panel assembly.

Figures 2, 6, 7:
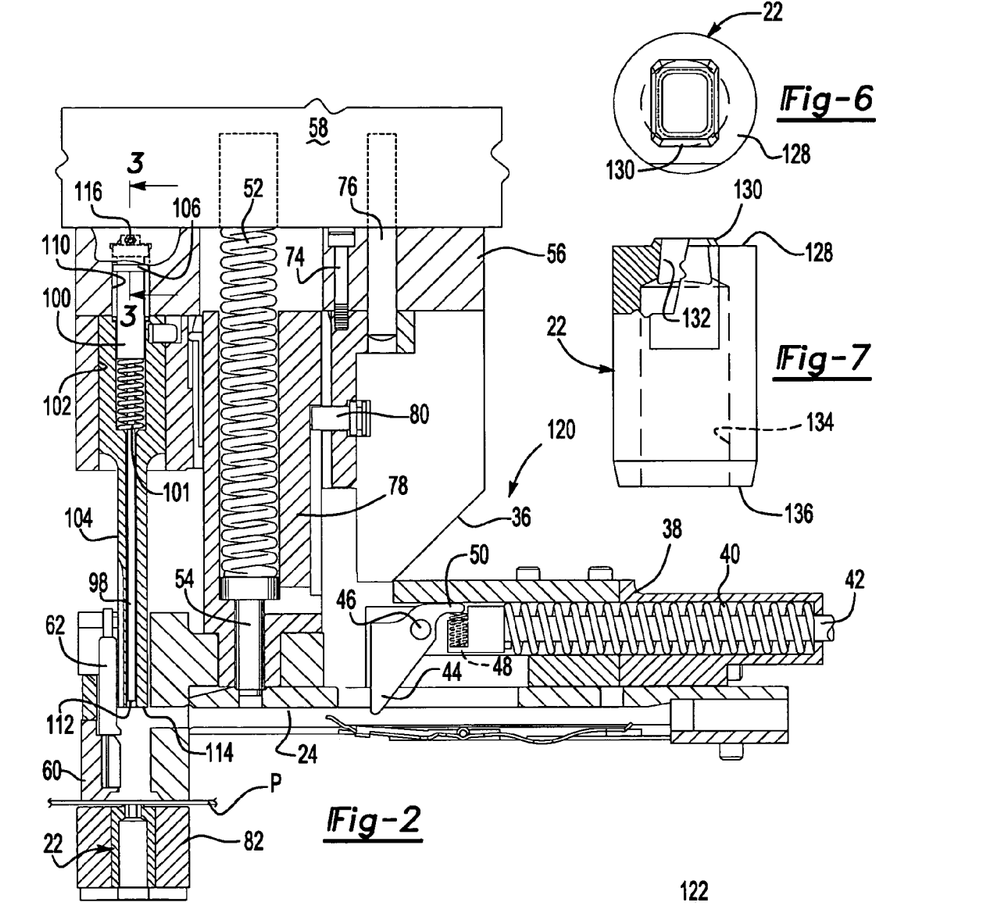
FIG. 2 is a side cross-sectional view of an alternative embodiment of a pierce nut installation head of this invention.
FIG. 6 is a top view of one preferred embodiment of the die button illustrated in the FIGS. 4 and 5A to 5C.
FIG. 7 is a side partially cross-sectioned view of FIG. 6.
Figure 3:
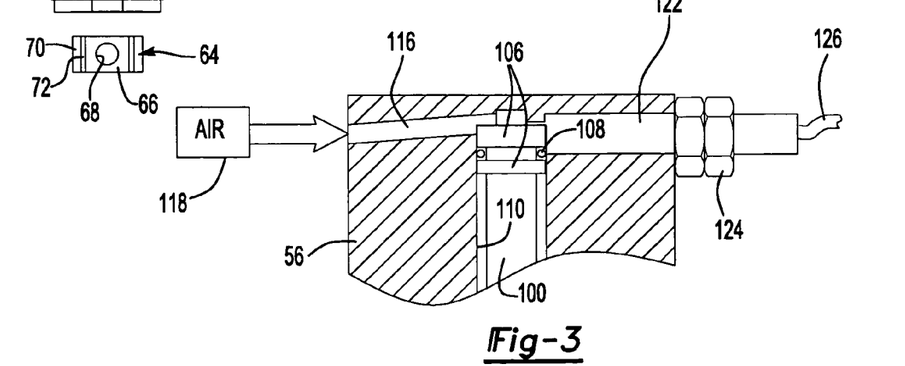
FIG. 3 is a partial end cross-sectional view of FIG. 2 in the direction of view arrows 3-3.

FIG. 2 illustrates an alternative embodiment of a pierce nut installation head 120 which differs from the pierce nut installation head 20 described above only with regard to the slug probe rod 98 as now described. All of the other components of the pierce nut installation head 120 which may be identical to the pierce nut head 20 described above are numbered the same as the pierce nut installation head 20 and thus no further description of these components is therefore required for a full understanding of the pierce nut installation head 120. In this embodiment, the slug probe rod 98 includes an enlarged cylindrical head portion 100 which is telescopically received in a cylindrical bore 102 in the plunger 104 and a return spring 101 is biased against the enlarged head portion 100, normally biasing the slug probe rod 98 axially toward the upper die shoe or die platen 58. The enlarged head portion 100 includes cylindrical radial flange portions 106 and O ring 108 shown in FIG. 3 is sealed against the cylindrical bore 110 in the back-up plate 56. As described above, the proximal end 112 of the slug probe rod 98 is generally parallel to or spaced above the proximal end 114 of the plunger 104. As shown in FIG. 3, the back-up plate 56 includes a port 116 which receives air under pressure from a source 118 which biases the slug probe rod 98 (FIG. 2) axially toward the panel P, serving the same function as the coil spring 94 in FIG. 1. The pierce nut installation head (20 or 120) further includes a proximity sensor 122 which senses the axial position of the slug probe rod 98 (FIG. 2) which is secured to one side of the back-up plate 56 by any suitable means, such as jam nuts 124, and the proximity sensor 122 includes an electrical wire 126 connected to the computer logic of the die press (not shown) as described below.

FIGS. 6 and 7 illustrate in more detail one embodiment of the die button 22 shown in FIGS. 1 and 2. The disclosed embodiment of the die button 22 includes an annular planar end face 128 surrounding clinching lips 130 which deform the panel metal surrounding the pierce panel opening into the grooves 72 during final installation of the pierce nut in a panel P as is well known to those skilled in this art and described further in the above-referenced U.S. patents. However, in this embodiment of the die button 22, the opening 132 through the die lips 130 is generally frustoconical which, in this embodiment, is rectangular and increasing in width from the clinching lips 130 to the enlarged cylindrical opening 134 through the distal end 136 of the die button 22. As described above, a conventional die button includes a rectangular opening having rounded corners which retain a plurality of panel slugs to prevent the panel slugs from being drawn upwardly against the pierce nut and panel assembly following opening of the die press (not shown). Without this feature, the panel slugs would litter the work area. However, in this embodiment of the pierce nut installation head, the resiliently biased slug probe rod 86 in FIGS. 1 and 98 in FIG. 2 positively ejects the panel slugs through the generally frustoconical opening 132 and out the enlarged cylindrical opening 134 as described further below.

Figure 5A:
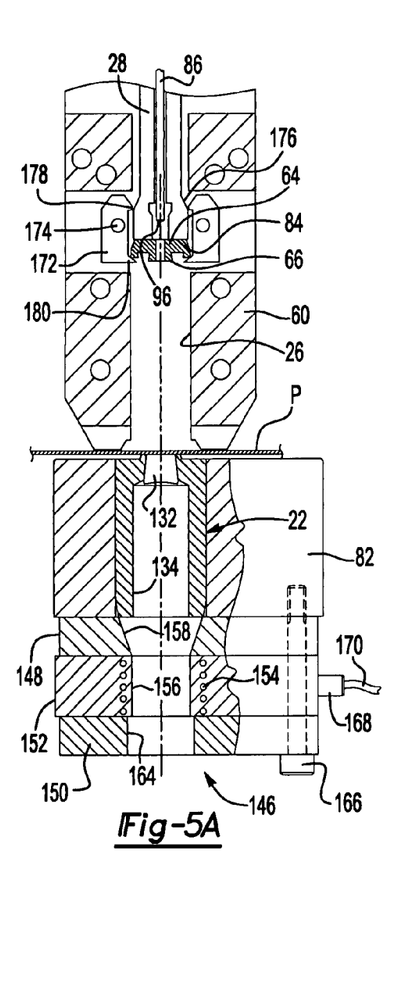
FIGS. 5A to 5C are partial side cross-section views of the pierce nut installation head shown in FIGS. 1 and 2 illustrating the sequence of installation of a pierce nut in a panel and an alternative embodiment of a slug sensor.
Figure 5B:
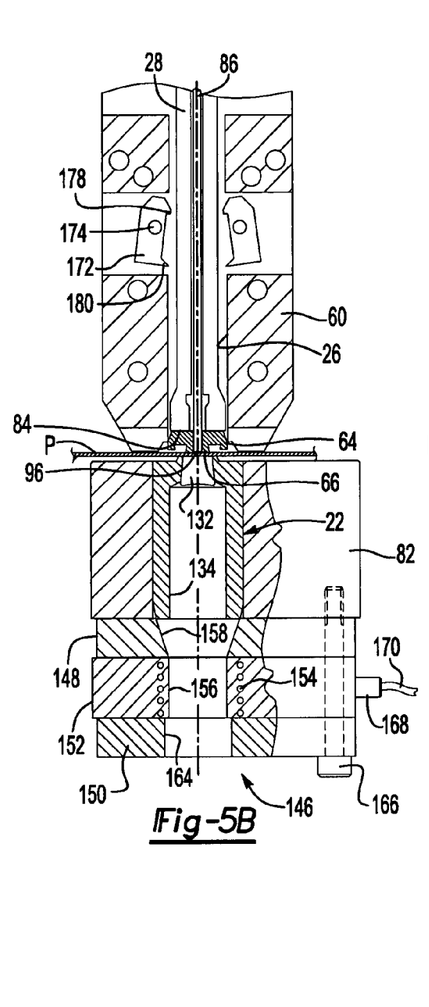
Figure 5C:
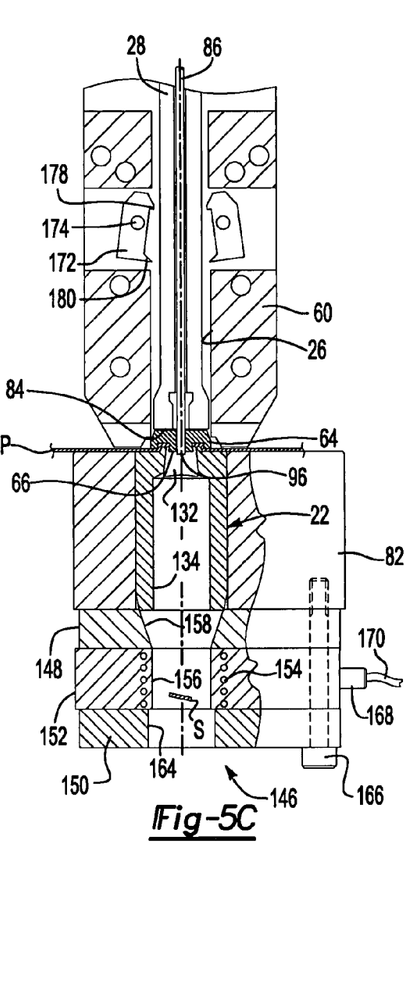

As set forth above, one preferred embodiment of the pierce nut installation apparatus of this invention further includes a panel slug sensor associated with the die button which provides further evidence of a proper pierce nut installation. The slug sensor may be any conventional sensor including, for example, a fiber optic or infrared sensor, a pneumatic probe, an electromagnetic sensor described below, a magnetic proximity probe, etc. FIG. 4 illustrates one embodiment of a slug sensor utilizing an infrared sensor, but may alternatively be a fiber optic sensor. In the embodiment illustrated in FIG. 4, the infrared sensor 138 is mounted on a tube 140 having an internal diameter generally equal to the internal diameter of the enlarged opening 134 of the die button and the tube 140 is mounted to the back-up plate 142 of the lower die shoe or platen. The infrared sensor 138 is then connected by an electrical wire 144 to the computer logic control of the die press (not shown). FIGS. 5A to 5C illustrate an alternative embodiment of a slug sensor and the sequence of operation of the pierce nut installation apparatus of this invention. The embodiment of the slug sensor 146 shown in FIGS. 5A to 5C is an electromagnetic sensor which is particularly suitable for application of pierce nuts in a metal panel, which is a primary application of this invention. The electromagnetic slug sensor 146 includes riser plates 148 and 150 on opposed sides of a proximity ring sensor 152. The riser plates 148 and 150, particularly the lower riser plate 150 are optional. The ring sensor 152 includes a conductive metal coil 154 surrounding a cylindrical opening 156. The upper riser plate 148 includes a frustoconical opening 158 coaxially aligned with the opening 134 through of the die button 22. The lower riser plate 150 has a cylindrical opening 164 having a diameter slightly greater than the internal diameter of the opening 156 through the ring sensor 152. The assembly is bolted by bolts 166 or other suitable fastening means to the support block 82 of the lower die platen, such that the openings 158, 156 and 164 are coaxially aligned with the opening 134 of the die button 22. As will be understood by those skilled in this art, a metal part, such as a metal panel slug received through the conductive coil 154 of the ring sensor 150 will generate a magnetic field and an electric current and the ring sensor 152 includes an electrical connector 168 having a wire 170 connected to the computer logic of the die press (not shown) to shut off the press in the event that a slug P is not received through opening 156 of the ring sensor 152 prior to installation of a second pierce nut as now described with regard to FIGS. 5A to 5C.

FIG. 5A illustrates the position and orientation of the pierce nut installation apparatus of this invention as the nose assembly 60 contacts the panel P as shown in FIGS. 1 and 2. As set forth above, the pierce nut installation head (20 or 120) is typically installed in the upper die shoe or platen of a die press and the die button 22 is typically installed in the lower die shoe or die platen of a die press (not shown). When the die press is open, the nose assembly 60 is spaced from the panel P and the die button 22 for receipt of a panel P. A pierce nut 64 is received in the plunger passage 26 from the feed passage 24 (FIGS. 1 and 2) as the press is opened by the feed adapter assembly 38. Then, as the die press is closed, the nose assembly first engages the panel P and the proximal end 84 of the plunger 28 engages a pierce nut 64 received in the plunger passage 26 from the feed passage 24 (see FIGS. 1 and 2). In the embodiment of the nose assembly shown in FIGS. 5A to 5C, the pierce nut 64 is initially retained in the plunger passage 26 by fingers 172 pivotally attached to the nose member 60 by pivot pins 174. In the disclosed embodiment, the plunger 28 includes opposed cam surfaces 176 and the fingers 172 include hook-shaped distal end portions 178 and hook-shaped proximal end portions 180 which rotate the fingers 172 to receive the hook-shaped proximal end portions 180 to retain a pierce nut 64 in the plunger passage 26 as shown in FIG. 5A. However, there are several types of plunger passage nut retainers as disclosed, for example, in the prior patents of Multifastener Corporation, the predecessor in interest of the assignee of this application. As shown in FIG. 5A, the proximal end 96 of the slug probe rod 86 is then spaced above the proximal end 84 of the plunger 28 as described above with regard to FIG. 1. This would be equally true of the slug probe rod 98 shown in FIG. 2, but for ease of description, the reference numbers for the plunger 28 and the slug probe rod 86 will be taken from FIG. 1.

FIG. 5B illustrates the position of the assembly at the moment the pilot portion 66 of the pierce nut 64 engages the panel P. Referring also to FIG. 1, the distal end 30 of the plunger engages the back-up plate 56 as the nose assembly 60 engages the panel and the plunger 28 is then driven through the plunger passage 26 to engage a pierce nut 64. In this embodiment, the distal end 30 of the plunger 28 is normally spaced from the back-up plate 56 by pneumatic pressure received through port 182. As the plunger 28 is driven past the feed passage 24 in FIG. 1, the fingers 172 rotate about pivot pins 174 to release the pierce nut 64 as shown in FIG. 5B. As also shown in FIG. 5B, the proximal end 96 of the slug probe rod 86 now engages the panel P against the force of the coil spring 94 in FIG. 1 or pneumatic pressure through port 116 in FIG. 3 because the slug probe rod 86 has an axial length greater than the plunger 28 as shown in FIG. 1. The same is true with regard to the slug probe rod 98 in FIG. 2.

Finally, the proximal end 84 of the plunger 28 drives the pilot portion 66 of the pierce nut 64 against the panel P, piercing a slug S from the panel and the clinching lips 130 of the die button (see FIG. 7) simultaneously deform the panel P surrounding the pierced panel opening into the grooves 72 on opposed sides of the pilot portion 66 (see FIG. 1), securely retaining the pierce nut 64 to the panel P as disclosed in more detail in U.S. Pat. No. 6,226,854 assigned to the assignee of this application. The die press (not shown) is now fully closed. Assuming that the pierce nut 64 is properly installed in the panel and the slug S is pierced from the panel, the proximal end 96 of the slug probe rod 86 will be received through the nut bore 68 (see also FIGS. 1 and 2) under the force of the coil spring 94 in FIG. 1 or air pressure through port 116 in FIG. 3 as shown in FIG. 5C indicating a good pierce nut installation. Further, the pierced panel slug S will be ejected through the opening 134 in the die button 22 by the slug probe rod 86, preventing the panel slug from adhering to the pierce nut and panel assembly and littering the work area. Thus, a preferred design of the die button 22 includes an opening 132 shown in FIG. 7 which is no longer required to retain the panel slugs S, but preferably includes a frustoconical opening 132 which promotes immediate ejection of the panel slugs S. However, in the event that a slug S is not pierced from the panel P, the proximal end 96 of the slug probe rod 86 will not be received through the pierce nut bore 68, but will engage the panel P indicating either that the pierce nut 64 has not been installed in the panel P or partially installed in the panel without fully piercing the panel indicating an improper installation. Finally, the panel slug S is received through the ring sensor 152 creating a magnetic field, as described above, indicating that the panel slug S has been fully ejected from the die button 22. Similarly, as shown in FIG. 4, the infrared sensor 138 will indicate that the panel slug has been ejected from the tube 140.

The pierce nut installation apparatus of this invention is thus self-diagnosing, eliminating the requirement for visual inspection of the pierce nut and panel assembly by the die press operator. As set forth above, the proximity sensor 122 shown in FIG. 3 senses the axial position of the slug probe rod which is connected by wire 126 to the computer logic of the die press (not shown), stopping the die press, preferably in the open position, in the event that the proximal end 96 of the slug probe rod 86 engages the panel P rather than being received through the pierce nut bore 68 indicating either that a pierce nut has not been installed in the panel or an improper pierce nut installation as described above.

Similarly, where the pierce nut installation apparatus of this invention further includes a slug sensor, such as the infrared sensor 138 shown in FIG. 4 or the magnetic ring sensor 152 shown in FIGS. 5A to 5C, the ring sensor is connected by wire 170 to the computer logic of the die press to stop the die press in the fully open position. As described above, stopping the die press in the open position indicates to the die press operator that maintenance or repair is required for proper installation of pierce nuts and reduces scrap particularly in mass production applications. As set forth above, several pierce nuts may be installed in a panel with each stroke of the die press and the panel may be simultaneously formed by the die press. Thus, the sensors of each of the pierce nut installation heads and die buttons may be connected to a control panel which indicates which pierce nut head and die button require inspection and maintenance or repair.

As will be understood by those skilled in this art, various modifications may be made to the pierce nut installation apparatus of this invention within the purview of the appended claims. First, the self-diagnosing features of this invention may be utilized with any pierce nut or pierce nut installation apparatus, including cold or die formed pierce nuts as disclosed in U.S. Pat. No. 3,878,599 assigned to the predecessor in interest of this application and the pierce nut installation head disclosed in U.S. Pat. No. 6,631,827 assigned to the assignee of this application. Further, the sensors utilized in the pierce nut installation apparatus of this invention including the proximity sensor 122 may be any suitable sensor, including electric, pneumatic, infrared and fiber optic sensors. A suitable proximity sensor is made by Turck Inc. of Plymouth, Minn. Further, the sensor, such as the infrared sensor 138 or the electromagnetic ring sensor 152 may be incorporated directly into the die button. Finally, as set forth above, the self-diagnosing pierce nut installation head 20 and 120 and the slug sensors 140 and 152 may be used separately or preferably in combination. Having described a preferred embodiment of the pierce nut installation apparatus of this invention, the invention is now claimed as follows.

The invention claimed is:

1. A pierce nut installation apparatus for installing pierce nuts into a panel, each pierce nut having a bore disposed therethrough, comprising:

a pierce nut installation head having a plunger passage for receiving a pierce nut for installation into the panel;

a plunger reciprocating in said plunger passage having a proximal end driving the pierce nuts through said plunger passage into the panel piercing a slug from the panel thereby forming an opening in the panel and installing the pierce nut into the opening in the panel left by the slug;

said plunger having an axial opening telescopically receiving a slug probe rod resiliently biased toward said proximal end of said plunger and extending beyond said proximal end of said plunger through the bore disposed in said pierce nut thereby ensuring the slug is pierced from the panel wherein said slug probe rod is resiliently biased toward said proximal end by a coil spring coaxial with said slug probe rod or by pneumatic pressure acting on said slug probe rod; and a slug sensor located beneath the panel for sensing if the slug has been pierced from the panel and has been ejected from said pierce nut installation apparatus.

2. The apparatus as set forth in claim 1, including a die button disposed beneath said plunger, said die button having an annular opening for receiving the slug pierced from the panel.

3. The apparatus as set forth in claim 2, wherein said slug sensor is disposed below said proximal end of said plunger.

4. The apparatus as set forth in claim 3, wherein said slug sensor is located proximate said die button.

5. The apparatus as set forth in claim 4, wherein said die button shields said slug sensor from the slug passing through said plunger passage.

6. The apparatus as set forth in claim 2, wherein said slug sensor is mounted in a tube being coaxially aligned with said die button.

7. The apparatus as set forth in claim 6, wherein said slug sensor comprises a ring sensor and said ring is coaxially aligned with said die button.

8. The apparatus as set forth in claim 6, wherein said slug sensor is conductive generating a magnetic field to identify the presence of a slug.

9. The apparatus as set forth in claim 1, wherein said slug sensor comprises an electric current sensor having a signal interrupted by the presence of a slug.

10. A pierce nut installation tool for installing a pierce nut into a panel, comprising:

an upper installation assembly spaced above a lower installation assembly for receiving the panel therebetween;

said upper installation assembly having a plunger with a proximal end reciprocating toward the panel for driving the pierce nut into the panel and said lower installation assembly having a die button cooperating with said proximal end of said plunger to pierce a slug from the panel into said lower installation assembly thereby forming a hole in the panel and plastically deforming the panel and fastening the pierce nut to the panel;

an ejector interacting with the slug pierced from the panel thereby ejecting the slug from said lower installation assembly, wherein said ejector comprises a slug rod telescopically extending beyond said proximal end of said plunger for forcing the slug pierced from the panel though said lower installation assembly, and wherein said slug rod is resiliently biased toward said proximal end by a coil spring coaxial with said slug rod or by pneumatic pressure acting on said slug rod; and a sensor disposed at said lower installation assembly for sensing if the slug has been ejected from said lower installation assembly by detecting the presence of the slug being ejected from said lower installation assembly.

11. The apparatus as set forth in claim 10, wherein said slug sensor comprises a ring sensor through which the slug passes.

12. The apparatus as set forth in claim 11, wherein said slug sensor is conductive generating a magnetic field to identify the presence of a slug.

13. The assembly as set forth in claim 10, wherein said sensor comprises an electromagnetic sensor defining a sensor aperture therein.

14. The assembly as set forth in claim 10, wherein said sensor signals an alarm when a slug has not been sensed in cooperation with said plunger reciprocating for driving the pierce nut into the panel.

15. The assembly as set forth in claim 14, wherein said sensor is shielded from contact with said slug passing through said sensor.

* * * * *